United States Patent Office 3,351,587
Patented Nov. 7, 1967

3,351,587
DIALKYL-OXO-DIAZASPIRO PENICILLINS
Harvey E. Alburn, West Chester, Norman H. Grant, Wynnewood, Donald E. Clark, Norristown, and Milton Wolf, West Chester, Pa., assignors to American Home Products Corporation, New York, N.Y., a corporation of Delaware
No Drawing. Filed Nov. 14, 1966, Ser. No. 593,690
10 Claims. (Cl. 260—239.1)

This invention relates generally to the production of synthetic penicillins, and, more particularly, to novel penicillin compounds derived from certain 6-(1-aminocycloalkylcarboxamido)penicillanic acids, as defined hereinafter, and to a method for the preparation of said derivatives.

Certain 6-(1-aminocycloalkylcarboxamido)penicillanic acids, per se, are already known to the art from U.S.P. 3,194,802, wherein a simple and economic method for the production thereof is disclosed. In accordance with said method, the now known compounds may generally be prepared by reacting a suitable 4-substituted-2,5-oxazolidinedione (also known as an N-carboxy amino acid anhydride) with 6-aminopenicillanic acid, under specified reaction conditions. As disclosed in said patent, the reaction is preferably caused to occur in a cold aqueous solution, which is stirred for several hours at a temperature from just above the freezing point of the aqueous mixture to about 37° C., and most preferably in the range of 0°–10° C.

The 6-(1-aminocycloalkylcarboxamido)penicillanic acids disclosed in said patent are of recognized value for their broad spectrum antibacterial activity, and are useful as therapeutical agents in poultry and in mammals, and particularly in man, in the treatment of infectious diseases caused by gram-positive and gram-negative bacteria, upon parenteral or oral administration.

We have now made the surprising discovery that said 6-(1-aminocycloalkylcarboxamido)penicillanic acids may be transformed into a completely new series of penicillanic acids also having value because of their broad spectrum antibacterial activity, similar to that of their known precursors. In addition, however, they have the highly desirable property of being very stable, and are less susceptible to hydrolysis; particularly when compared with generally related penicillins.

The novel compounds of the present invention, when considered in their broadest aspect, include those compounds encompassed within the following structural formula:

I.

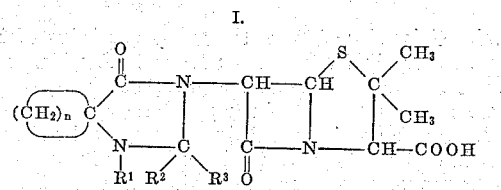

and the pharmaceutically acceptable salts thereof;

wherein $n$ may be an integer from 2 to 9, $R^1$ may be selected from the group consisting of hydrogen, lower alkyl, and aryl; $R^2$ and $R^3$ may each be selected from the group consisting of hydrogen, lower alkyl and aryl, and $R^2$ and $R^3$ may be joined to form an alicyclic ring.

Generally, the novel compounds of the invention may be prepared by admixing a selected one of the 6-(1-aminocycloalkylcarboxamido)penicillanic acids referred to hereinbefore, with a suitable carbonyl compound, in an organic solvent; and subjecting the resulting reaction mixture to slow distillation to give the desired new penicillin product, usually as a filterable residue. By "carbonyl compound" is meant those compounds having a carbonyl group capable of entering into a Mannich type reaction for coupling onto the reactive nitrogen atoms of (1) the 6-amino group of the penicillanic acid moiety, and (2) the alpha-amino group on the carbon atom of the cycloalkyl group by which the latter is connected to the penicillin moiety. By "organic solvent" is meant any polar compound capable of forming a distillable reaction mixture of the selected penicillanic acid and carbonyl compound reactants. The general reaction involved in the preparation of the compounds may be shown schematically as follows:

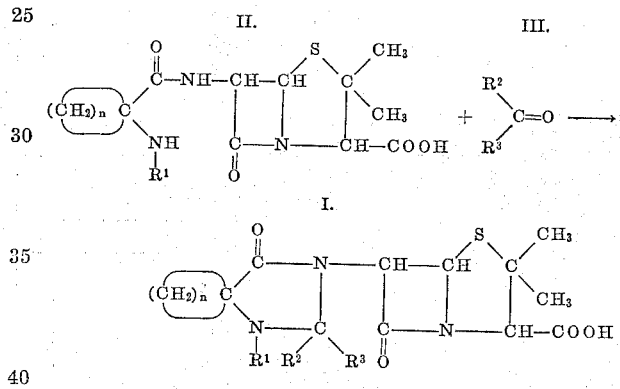

wherein $n$, $R^1$, $R^2$ and $R^3$ have the same meanings as described for Formula I hereinbefore.

Probably due to the fact of the more rigid configuration of the 1-aminoalicyclicamino acid group attached to the penicillin moiety, the novel penicillin derivatives of Formula I described herein are more stable and less susceptible hydrolysis on standing in aqueous solutions, as referred to previously herein. Since, in the preparation of said novel derivatives, the carbonyl compound adduct of the penicillin starting material in effect neutralizes the amino groups thereof; the resulting penicillins, moreover, have acidic properties, and this facilitates the isolation thereof after synthesis. This also facilitates the preparation of the salts of the penicillins in conventional manner, which would be difficult or impossible to accomplish otherwise. In consequence of their acidic and stable properties, the novel penicillins per se of the invention tend not to break down until they are in alkaline medium such as in the blood stream, so that more prolonged blood levels may be obtained after administration.

The following examples are illustrative of the invention, but are not to be considered as necessarily limitative thereof.

EXAMPLE 1

6-(2,2-dimethyl-4-oxo-1,3-diazaspiro[4,4]nonan-3-yl)penicillanic acid

A mixture of 2 g. of 6-(1-aminocyclopentanecarboxamido)penicillanic acid, 0.1 g. of p-toluenesulfonic acid, and 400 ml. of acetone was subjected to a slow distillation with periodic replacement of the acetone over a period of 5 hours. The reaction mixture was filtered, giving a residue of 300 mg. The filtrate was concentrated to about 20 ml. and chilled. There was then added 100 ml. of ethyl ether, and the suspension was filtered. The product weighed 1.3 g.

Calcd. for $C_{17}H_{25}N_3O_4S$: C, 55.5; S, 8.7. Found: C, 55.3; S, 8.9.

The product was active against Staphylococcus aureus strains 6538P, 53–180, and CHP.

The stability of the adduct and its ability to mask the β-lactam was shown by dissolving the product in 0.02 M potassium phosphate buffer, pH 7.0, and assaying for the β-lactam after various time periods at 22° by formation of the hydroxamic acid:

| Time: | Percent of theoretical β-lactam |
|---|---|
| 3 min. | 7 |
| 18 hr. | 27 |
| 24 hr. | 30 |
| 43 hr. | 42 |
| 48 hr. | 52 |
| 64 hr. | 65 |

EXAMPLE 2

6-(2,2-dimethyl-4-oxo-1,3-diazaspiro[4,4]nonan-3-yl)penicillanic acid

A mixture of 3 g. of 6-(1-aminocyclopentanecarboxamido)penicillanic acid, 0.1 g. of p-toluenesulfonic acid, and 600 ml. of acetone was prepared. The reaction was carried out in a 6 hour distillation process during which acetone was re-added to the system periodically. A 500 mg. residue was removed by filtration, and the filtrate was evaporated to 25 ml. Then 100 ml. of ethyl ether was added, giving a precipitate weighing 1.8 g.

Calcd. for $C_{17}H_{25}N_3O_4S$: C, 55.5; H, 6.8; N, 11.4. Found: C, 55.6; H, 6.7; N, 11.4.

EXAMPLE 3

6-(2,2-dimethyl-2-oxo-1,3-diazaspiro[4,5]decan-3-yl)penicillanic acid

A mixture of 1.4 g. of 6-(1-aminocyclohexanecarboxamido)penicillanic acid, 0.1 g. of p-toluenesulfonic acid, and 400 ml. of acetone was prepared. The acetone was distilled off, and periodically more acetone was added, so that the total distillation time was about 5 hours. The solution was concentrated to about 10 ml., and 150 ml. of ethyl ether was added. The precipitate was filtered off, and weighed 300 mg. when dry. The filtrate was evaporated to dryness, giving the product, which weighed 1.0 g.

Calcd. for $C_{18}H_{27}N_3O_4S$: C, 56.7; H, 7.1; S, 8.4. Found: C, 56.5; H, 6.9; S, 8.8.

The product was active against Bacillus subtilis 6633 and Escherichia coli strains 6880 and 11370.

EXAMPLE 4

Following the procedure of Example 1, other suitable penicillanic acid compounds are reacted with selected carbonyl compounds to give corresponding penicillanic acid products of the invention, as set forth in the following Table A:

TABLE A

| Penicillanic Acid Compound | Carbonyl Compound | Penicillanic Acid Product |
|---|---|---|
| 6-(1-aminocyclobutanecarboxamido)-penicillanic acid. | Formaldehyde | 6-(4-oxo-1,3-diazaspiro[4,3]octan-3-yl)-penicillanic acid. |
| 6-(1-aminocyclooctanecarboxamido)-penicillanic acid. | Acetone | 6-(2,2-dimethyl-4-oxo-1,3-diazaspiro-[4,7]dodecan-3-yl)penicillanic acid. |
| 6-(1-aminocyclodecanecarboxamido)-penicillanic acid. | do | 6-(2,2-dimethyl-4-oxo-1,2-diazaspiro-[4,9]tetradecan-3-yl)penicillanic acid. |
| 6-(1-aminocyclopentanecarboxamido)-penicillanic acid. | Propanal | 6-(2-ethyl-4-oxo-1,3-diazaspiro[4,4]-nonan-3-yl)penicillanic acid. |
| 6-(1-aminocyclohexanecarboxamido)-penicillanic acid. | Methylethylketone | 6-(2-methyl-2-ethyl-4-oxo-1,3-diazaspiro-[4,5]decan-3-yl)penicillanic acid. |
| 6-(1-aminocyclopentanecarboxamido)-penicillanic acid. | Cyclohexanone | 6-(2,2-cyclohexyl-4-oxo-1,3-diazaspiro-[4,4]nonan-3-yl)penicillanic acid. |
| 6-(1-aminocyclohexanecarboxamido)-penicillanic acid. | Acetaldehyde | 6-(2-methyl-4-oxo-1,3-diazaspiro[4,5]-decan-3-yl)penicillanic acid. |
| 6-(1-aminocyclopentanecarboxamido)-penicillanic acid. | Butyraldehyde | 6-(2-propyl-4-oxo-1,3-diazaspiro[4,4]-nonan-3-yl)penicillanic acid. |
| Do | Isobutyraldehyde | 6-(2-isopropyl-4-oxo-1,3-diazaspiro[4,4]nonan-3-yl)penicillanic acid. |
| 6-(1-aminocyclohexanecarboxamido)-penicillanic acid. | Cyclopentanone | 6-(2,2-cyclopentanyl-4-oxo-1,3-diazaspiro-[4,5]decan-3-yl)penicillanic acid. |
| Do | Benzaldehyde | 6-(2-phenyl-4-oxo-1,3-diazaspiro[4,5]-decan-3-yl)penicillanic acid. |
| Do | Methylpentylketone | 6-(2-methyl-2-pentyl-4-oxo-1,3-diazasprio-[4,5]decan-3-yl)penicillanic acid. |
| 6-[1-(N-ethylamino)cyclobutane-carboxamido]penicillanic acid. | Acetone | 6-[1-(N-ethylamino)-2,2-dimethyl-4-oxo-1,3-diazaspiro-[4,3]octan-3-yl]penicillanic acid. |
| 6-[1-(N-phenylamino)cyclobutane-carboxamido]penicillanic acid. | do | 6-[1-(N-phenylamino)-2,2-dimethyl-4-oxo-1,3-diazaspiro[4,3]octan-3-yl]penicillanic acid. |
| 6-[1-(N-benzylamino)cyclobutane-carboxamido]penicillanic acid. | do | 6-[1-(N-benzylamino)-2,2-dimethyl-4-oxo-1,3-diazaspiro[4,3]octan-3-yl]penicillanic acid. |

We claim:
1. A compound of the group having the formula:

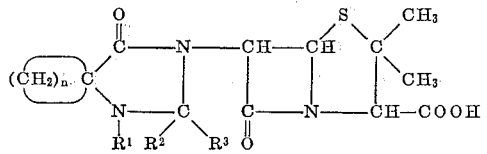

wherein $R^1$ is selected from the group consisting of hydrogen, lower alkyl and phenyl; $R^2$ and $R^3$, when separate, are each selected from the group consisting of hydrogen, lower alkyl and phenyl; and $R^2$ and $R^3$, when joined, complete a ring which is lower cycloalkyl having up to six carbon atoms, and $n$ is an integer from 2 to 9.

2. A compound in accordance with claim 1, which is: 6 - (2,2 - dimethyl - 4 - oxo - 1,3 - diazaspiro[4,4]nonan-3-yl)penicillanic acid.

3. A compound in accordance with claim 1, which is: 6 - (2,2 - dimethyl - 4 - oxo - 1,3 - diazaspiro[4,5]decan-3-yl)penicillanic acid.

4. A compound in accordance with claim 1, which is: 6 - (4 - oxo - 1,3 - diazaspiro[4,3]octan-3-yl)penicillanic acid.

5. A compound in accordance with claim 1, which is: 6 - (2,2 - dimethyl - 4 - oxo - 1,3 - diazaspiro[4,7]dodecan-3-yl)penicillanic acid.

6. A compound in accordance with claim 1, which is: 6 - (2,2 - dimethyl - 4 - oxo - 1,3 - diazaspiro[4,9]tetradecan-3-yl)penicillanic acid.

7. A compound in accordance with claim 1, which is: 6 - (2 - ethyl - 4 - oxo - 1,3 - diazaspiro[4,4]nonan-3-yl)penicillanic acid.

8. A compound in accordance with claim 1, which is: 6 - (2 - methyl - 2 - ethyl - 4 - oxo - 1,3 - diazaspiro[4,5]decan-3-yl)penicillanic acid.

9. A compound in accordance with claim 1, which is: 6 - (2,2 - cyclohexyl - 4 - oxo - 1,3 - diazaspiro[4,4]nonan-3-yl)penicillanic acid.

10. A compound in accordance with claim 1, which is: 6 - (2 - methyl - 4 - oxo - 1,3 - diazaspiro[4,5]decan-3-yl)penicillanic acid.

References Cited
UNITED STATES PATENTS 3,316,273   4/1967   Gottstein et al. ____ 260—239.1

NICHOLAS S. RIZZO, *Primary Examiner.*